United States Patent [19]

Parachinni

[11] Patent Number: 5,285,701
[45] Date of Patent: Feb. 15, 1994

[54] GEARING MECHANISM FOR HIGH SPEED BICYCLES

[76] Inventor: Danial Parachinni, 3074 S. Lock St., Chicago, Ill. 60608

[21] Appl. No.: 888,126

[22] Filed: May 26, 1992

[51] Int. Cl.⁵ ............................................. G05G 1/14
[52] U.S. Cl. ................... 74/594.2; 74/594.1; 474/69; 474/70; 280/259
[58] Field of Search .............. 74/594.1–594.3, 74/502.2; 474/78–82, 69, 70; 280/259, 261

[56] References Cited

U.S. PATENT DOCUMENTS

| | | | |
|---|---|---|---|
| 363,189 | 5/1887 | Watson | 74/594.1 |
| 627,335 | 6/1899 | Johnson | 74/594.1 |
| 641,533 | 1/1900 | Myers | 74/594.1 |
| 737,603 | 9/1903 | Fritz | 74/594.2 |
| 1,093,729 | 4/1914 | Ruff | 74/594.2 |
| 1,381,281 | 6/1921 | Clark | 74/594.1 |
| 4,281,845 | 8/1981 | Brown | 474/72 X |
| 4,300,411 | 11/1981 | Segawa | 74/594.2 |
| 4,331,043 | 5/1982 | Shimano | 74/594.2 |
| 4,583,422 | 4/1986 | Boyd | 74/594.2 |
| 4,594,910 | 6/1986 | Nagano | 74/594.1 X |
| 4,608,878 | 9/1986 | Shimano | 74/594.2 |
| 4,924,723 | 5/1990 | Cristie | 74/502.2 |
| 5,005,674 | 4/1991 | Piatt | 74/502.2 |
| 5,067,370 | 11/1991 | Lemmens | 74/594.2 |
| 5,097,719 | 3/1992 | Lohman et al. | 74/502.2 |

FOREIGN PATENT DOCUMENTS

| | | | |
|---|---|---|---|
| 0002903 | 7/1979 | European Pat. Off. | 280/259 |
| 2441533 | 7/1980 | France | 74/594.2 |

Primary Examiner—Vinh T. Luong
Attorney, Agent, or Firm—Marshall, O'Toole, Gerstein, Murray & Borun

[57] ABSTRACT

A bicycle is provided that has a frame with a seat tube and a down tube aligned in the same plane, a chain stay rail, a free wheel mechanism and a crank hub. The bicycle is improved by having an enlarged crank sprocket rotatable in a plane substantially parallel to bike frame and able to provide a gear ratio of at least 4.5 to 1 with respect to the free wheel mechanism. The crank sprocket is stabilized to prevent it from wobbling and to maintain its rotation in a parallel plane. The crank sprocket is also extended away from the hub to allow the crank sprocket to rotate without coming in contact with the chain stay rail. Preferably, the crank sprocket can provide a gear ratio of 6.5 to 1 with respect to the free wheel mechanism and has a plane of rotation located at about the center of the axial width of the free wheel mechanism.

22 Claims, 2 Drawing Sheets

GEARING MECHANISM FOR HIGH SPEED BICYCLES

FIELD OF THE INVENTION

This invention relates to bicycles and in particular to gearing mechanisms for bicycles.

BACKGROUND OF THE INVENTION

Though current conventional bicycles are intended to travel quickly, they are not able to achieve the speeds of bicycles equipped with the present invention. To achieve higher rates of speed than are currently obtainable by current conventional bicycles, the gear ratio between the crank sprocket and the gears on the rear wheel free wheel mechanism must be increased. One way to achieve this goal is to drastically increase the diameter of the crank sprocket.

Enlarged diameter crank sprockets have been used on multi-wheeled cycles, such as tricycles and polycycles. For example, U.S. Pat. Nos. 1,093,729 and 363,189 describe enlarged diameter crank sprockets. These prior art sprockets appear to be located in the middle of the pedal crank shafts. These multi-wheeled cycle crank sprockets can be larger than conventional bicycle sprockets as the sprockets are free from a bicycle's structural constraints and are subject to different forces. In addition, the multi-wheeled cycles containing the enlarged crank-sprockets are not used to obtain the high speeds possible with the present invention.

Bicycles with drastically enlarged crank sprockets are not known to exist on conventional bicycles. This is apparently due to several reasons. Conventional bicycle frames cannot accommodate enlarged diameter crank sprockets. An enlarged bicycle crank sprocket if placed on the hub in the original position of a conventional crank sprocket could not rotate in a plane parallel to the bicycle frame without coming in contact with a chain stay rail of the frame.

In addition, if the enlarged crank sprocket is extended away from the hub to clear this chain stay rail and is constructed similarly to a conventional crank sprocket, the enlarged crank sprocket would be unstable and would wobble and not rotate in a plane parallel to the frame. This wobbling would reduce a peddler's ability to produce torque (and, therefore, speed) and ultimately may cause the chain to derail. In addition, an extended enlarged crank sprocket would eventually warp or buckle. These problems are compounded in the case of multi-speed bicycles.

Accordingly, it is desired to provide a multi-speed bicycle capable of achieving high speed utilizing an enlarged crank sprocket.

SUMMARY OF THE INVENTION

The current invention solves the above problems and provides a multi-speed gearing mechanism for a conventional bicycle capable of achieving high speed.

A bicycle is provided that has a frame with a seat tube and a down tube aligned in the same plane, a chain stay rail, a free wheel mechanism and a crank hub. The bicycle is improved by having an enlarged crank sprocket rotatable in a plane substantially parallel to a planarly aligned seat tube and down tube and able to provide a gear ratio of at least 4.5 to 1 with respect to the free wheel mechanism. The crank sprocket is stabilized to prevent it from wobbling and so as to maintain its rotation in a plane. The crank sprocket is also extended away from the hub to allow the crank sprocket to rotate without coming in contact with the chain stay rail.

Preferably, the crank sprocket can provide a gear ratio of 6.5 to 1 with respect to the free wheel mechanism and has a plane of rotation located at about the center of the axial width of the free wheel mechanism.

The gear ratios provided by the present invention allows bicycles to achieve high rates of speed not believed to have been attainable with conventional bicycles.

BRIEF DESCRIPTION OF THE DRAWINGS

The foregoing and other objects, features and advantages of the invention will be apparent from the following description thereof, as illustrated in the accompanying drawings in which like reference characters refer to the same parts throughout the different views.

DETAILED DESCRIPTION

Figure 1:
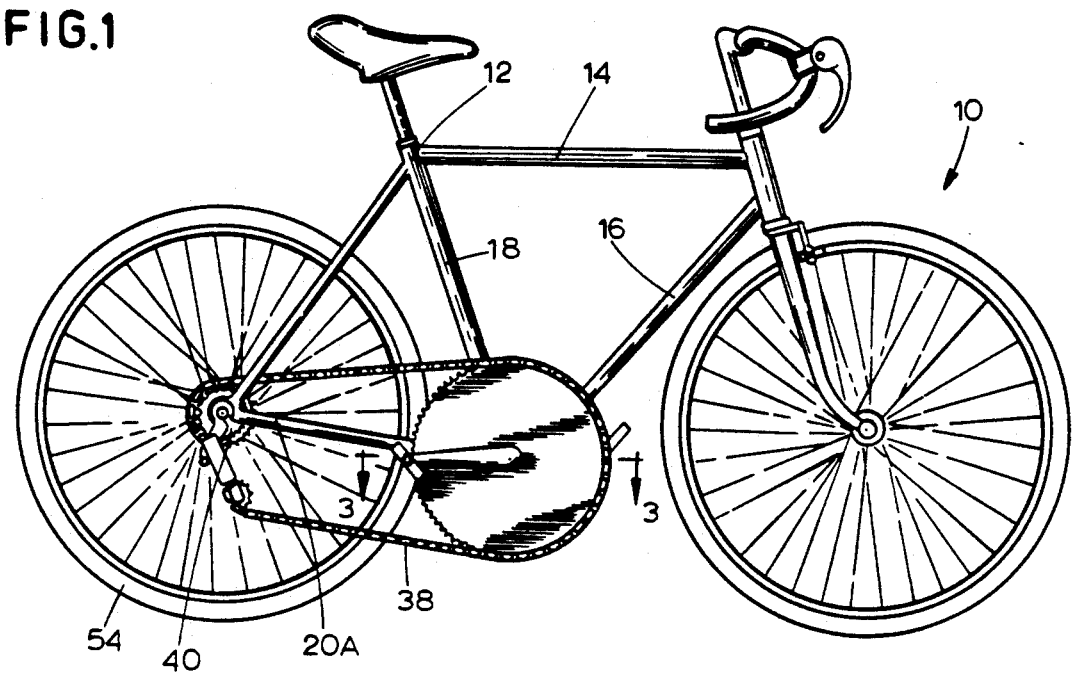
FIG. 1 is a front elevation view of a bicycle containing the gearing mechanisms of the present invention.
Figure 2:
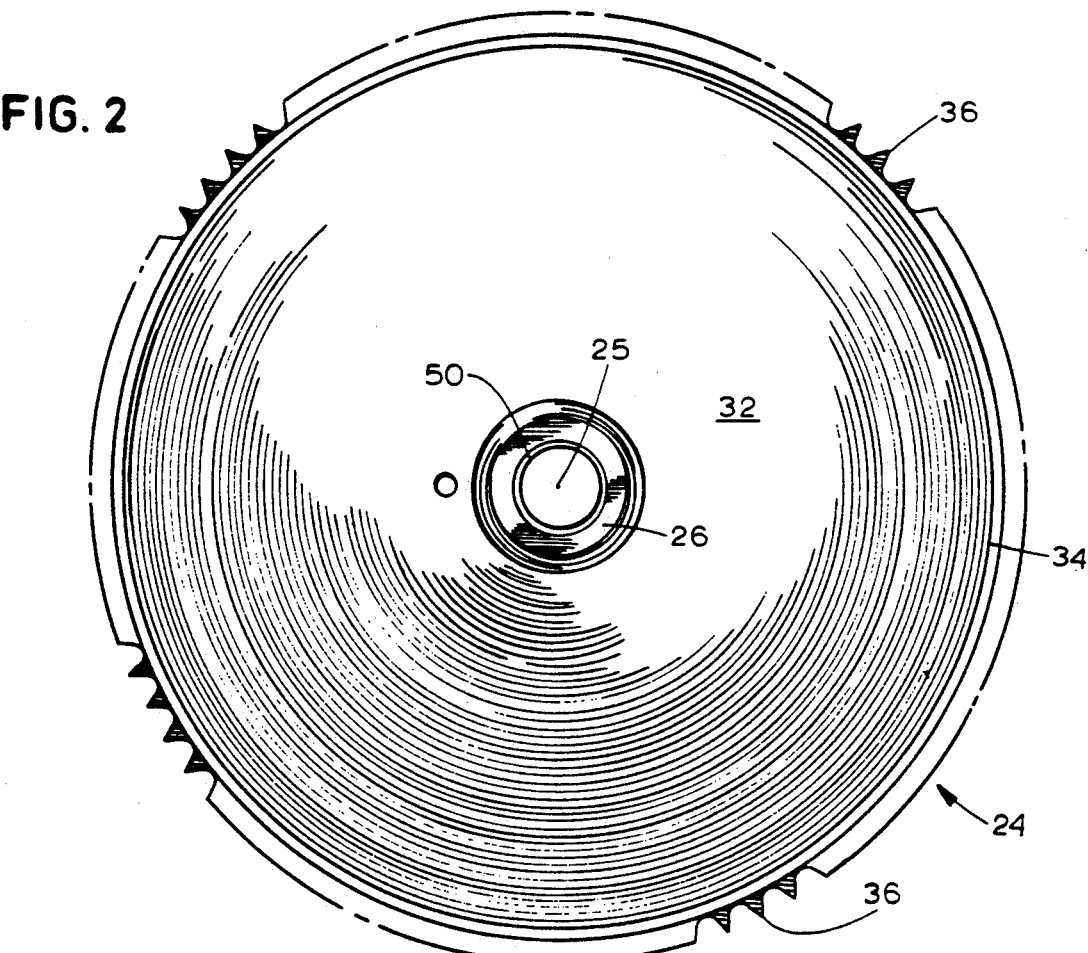
FIG. 2 is an enlarged view of the crank sprocket of the present invention taken from the rear view of FIG. 1.
Figure 3:
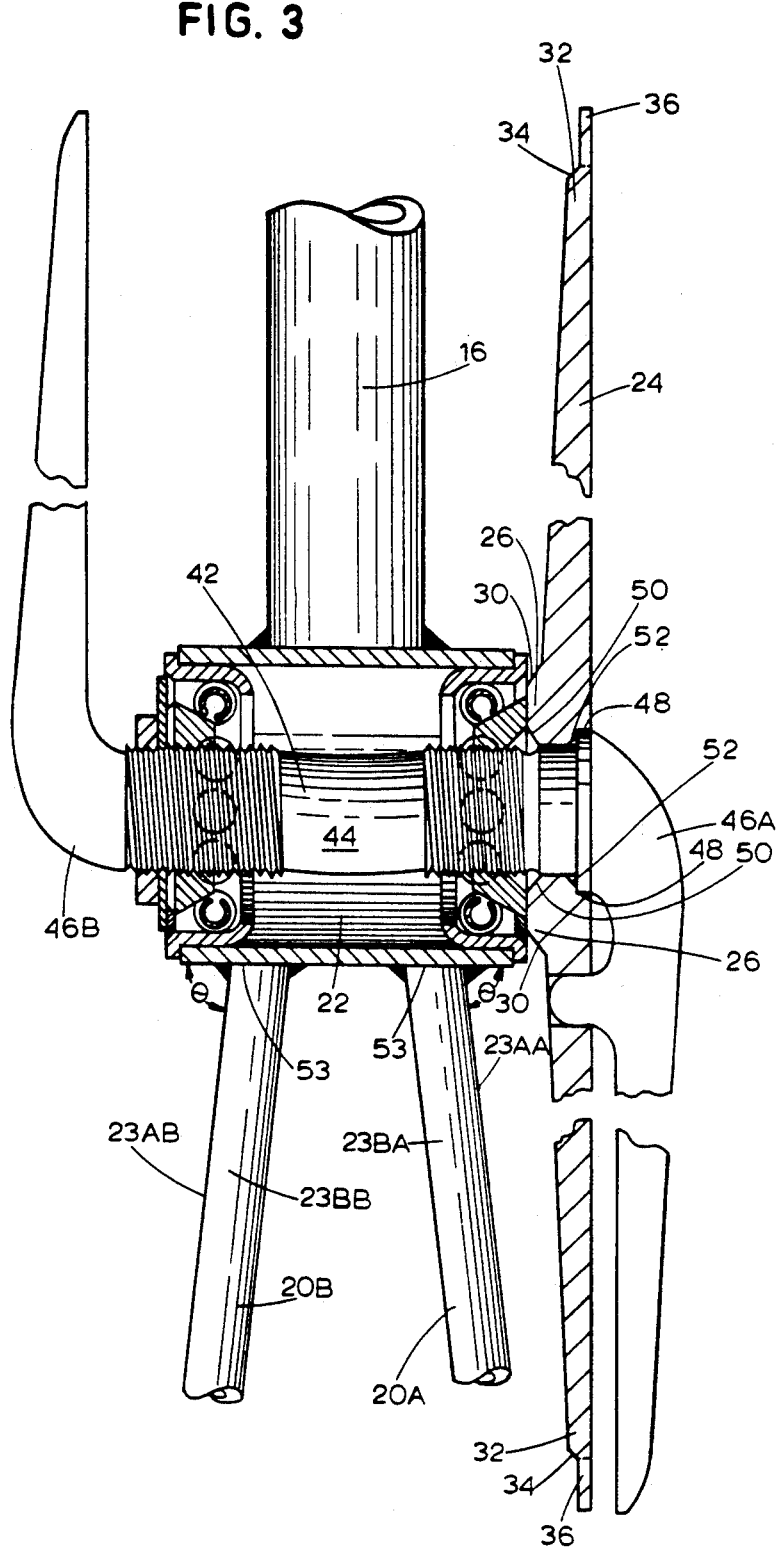
FIG. 3 is an enlarged fragmented partially cross section view taken substantially on line 3—3 of FIG. 1.
Figure 4:
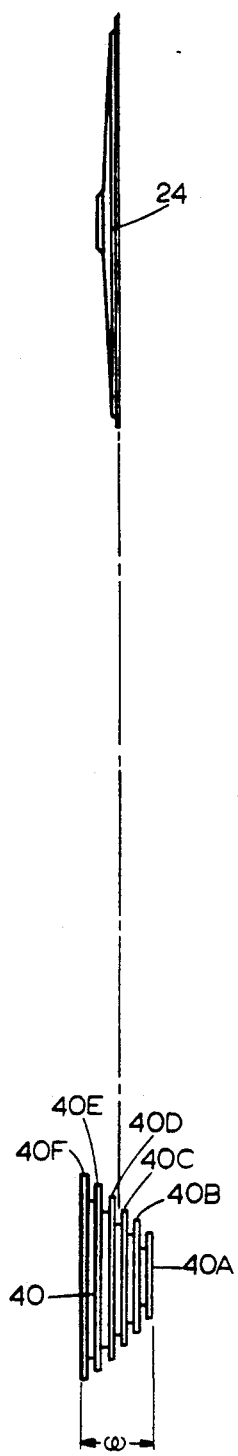
FIG. 4 a schematic illustration of the alignment of the crank sprocket in relation to the gears of the free wheel mechanism useful in understanding the invention.

As seen in FIGS. 1 and 3, a bicycle 10 employing the gearing mechanism of the present invention is shown. The bicycle includes a frame 12 having a crossbar 14, a down tube 16 and a seat tube 18, all aligned in one plane. The frame further includes two chain stay rails 20A and 20B and a crank hub 22. Chain stay rails 20A and 20B each have an outer facing side 23AA and 23AB respectively, and a wheel facing side 23BA and 23BB respectively. The gearing mechanism of the present invention includes an enlarged crank sprocket 24 having a hole 25 in its center. As best seen in FIGS. 3 and 4, the enlarged crank sprocket 24 is extended outwardly away from the crank hub 22 and the chain stay rail 20A by an extender portion 26 of the crank sprocket 24. This extension enables the crank sprocket 24 to rotate in a plane parallel to the plane containing the downtube 16 and seat tube 18 without coming in contact with the chain stay rail 20A. The extender portion 26 as shown in FIGS. 2 and 3 has a conical washer like shape of a given thickness, hole 25 in its center, and an outside edge 30 that is tapered along its conical exterior surface.

As shown in FIG. 3 the extender portion 26 is an integral portion of the crank sprocket 24. The extender portion, however, can be a separate washerlike piece located between the hub 22 and the crank sprocket 24 coupled to or independent of the crank sprocket 24.

The crank sprocket 24 also includes an integral stabilizer portion 32. The stabilizer portion 32 is shaped like a disk, has hole 25 in its center and varies in thickness. The center section of the stabilizer portion 32 integral with the extender portion 26 is the thickest section of the stabilizer portion 32. The stabilizer portion 32 radially thins or tapers out from its center section towards its outer edge 34. The stabilizer portion 32 strengthens and stabilizes the crank sprocket 24. This stabilization prevents the crank sprocket 24 from wobbling during rotation and maintains crank sprocket rotation in a plane substantially parallel to the plane formed by the crossbar 14, down tube 16 and seat tube 18. Rather than the integral stabilizer portion 32 described above, a separate plate or series of plates can be coupled to the crank sprocket to stabilize it.

The thickness and diameter of the stabilizer portion will vary depending upon the outside diameter of the crank sprocket 24. Generally, the larger the diameter of the crank sprocket the larger both the thickness and the diameter of the stabilizer portion 32 will be to stabilize the crank sprocket 24.

As discussed above, the extender portion 26 and stabilizer portion 32, as shown in FIG. 3, can be part of a one piece crank sprocket construction or individual pieces attached to the crank sprocket by riveting, welding or any other conventional process. In addition, the extender portion 26 may be a separate piece independent of either the crank sprocket 24 or the stabilizer portion 32. The crank sprocket 24, the extender portion 26, and the stabilizer portion 32 can also be constructed out of a strong lightweight material.

The crank sprocket 24 also includes teeth 36 for engaging a bicycle chain 38. Conventional ten and twelve speed bicycle crank sprockets typically have two crank sprockets of different diameter. The smaller diameter conventional crank sprocket typically has between forty-two and forty-eight teeth. The larger diameter conventional crank sprocket typically has between fifty-two and fifty-three teeth. The present invention's crank sprocket 24 is intended to accommodate up to seventy-four or seventy-eight teeth or more. To accommodate this number of teeth, the outside diameter of the crank sprocket 24 must be over twelve inches. Conventional multi-speed bicycle crank sprockets typically only have outside diameters between about seven one-half and eight one-half inches.

As seen in FIGS. 1 and 4, to power the bicycle 10, the crank sprocket 24 is attached by the chain 38 to a multi-gear free wheel mechanism 40. Normally, this mechanism 40 contains five or six gears. Each gear typically has between twelve and thirty-four teeth for engaging the chain 38. Maximum gear ratios between the crank sprocket and free wheel mechanism for conventional multispeed bicycles are then about 53:12 or about 4.4:1. Gear ratio is defined as the ratio between the number of teeth on the crank sprocket 24 and the number of teeth on whichever one of the gears of the free wheel mechanism 40 that is engaged with the crank sprocket 24 via the chain 38. As seen in FIG. 4, the free wheel mechanism 40 consists of six gears 40A, 40B, 40C, 40D, 40E, 40F. Gear 40A has the smallest outside diameter and the smallest number of teeth. Gears 40B–40F each progressively have a larger outside diameter and more teeth than the preceding gear 40A–40E. When the chain 38 is engaged with a gear of the free wheel mechanism 40 and the enlarged crank sprocket 24 of the present invention, the gear ratio between the two is greater than is known to have been used in the past with bicycles. When the chain 38 is engaged with both gear 40A and the crank sprocket 24, the maximum gear ratio between the crank sprocket and the free wheel mechanism 40 is reached, allowing the bicycle 10 to reach a maximum speed. The maximum gear ratio for the present invention is thus at least 78:12 or 6.5:1. When the chain 38 is engaged with the crank sprocket and the other larger diameter gears 40B–40F, the gear ratio between the crank sprocket 24 and free wheel mechanism 40 is reduced. The smallest gear ratio is provided when the crank sprocket 24 is attached by the chain 38 to gear 40F. If the crank sprocket 24, has 78 teeth, the minimum gear ratio is at most 78:34 or about 2.29:1.

In an alternative embodiment of the present invention, the circumferential or perimeter portion of the crank sprocket 24 containing the teeth 36 may be a separate ring like piece that can be fastened to the stabilizer portion 32. With this separate piece configuration, both the stabilizer portion 32 and the ring like teeth containing portion have a matching series of holes through which screws or other fastening means pass to secure the ring like portion to the stabilizer portion 32. This separate ring like piece is interchangeable with other different size ring like pieces containing different numbers of teeth 36. Thus, the gear ratio between the crank sprocket and free wheel mechanism can easily be changed by simply changing the ring like portion. This change requires little disassembly or reassembly.

Due to the diameter of the crank sprocket 24, it is critical where the crank sprocket's plane of rotation is located relative to the multi-geared free wheel mechanism 40. As shown in FIG. 4, to prevent the chain 38 derailing off the crank sprocket 24, the crank sprocket 24 must be extended out from the hub so its plane of rotation is at or near the center of the axial width "w" of the free wheel mechanism, the distance between the center of gear 40A and the center of gear 40F. Thus, the crank sprocket's 24 plane of rotation is aligned so as to be between gears 40C and 40D.

The location of a conventional multi-speed bicycle crank sprocket's plane of rotation is not so critical because it does not have such a drastically enlarged crank sprocket and because its gearing mechanism includes a front derailleur chain guide to exchange the chain between the two crank sprockets and to maintain the chain on one of the sprockets during rotation. The location of the plane of rotation of crank sprocket 24 helps prevent crank sprocket chain derailment without the aid of a front derailleur chain guide.

As shown in FIG. 3, the present invention is designed to accommodate a conventional one piece crank 42. A conventional size one piece crank 42 passes through the crank sprocket 24 and the crank hub 22. The crank 42 includes a crankshaft 44, a left crank arm 46A and a right crank arm 46B. To accommodate for the added clearance distance (not necessary in conventional bicycles) needed to extend the crank sprocket 24 away from the crank hub 22, the crank's 42 position is shifted from a normal central position toward the crank sprocket 24 thereby positioning left crank arm 46B closer to the crank hub 22 than a left crank arm on a conventional bicycle equipped with a one piece crank would be. To further accommodate for the added distance, the hole 25 of the crank sprocket 24 varies in diameter. The hole 25 has a larger diameter counterbore portion 48 furthest away from the hub 22 and then narrows to a smaller diameter toward the stabilizer portion 32. A portion of the right crank arm 40A is able to fit into the counterbore portion 48 thereby eliminating the need to lengthen the crank shaft 44.

To enable the use of a one piece crank 42, a countersink portion 50 of the hole 25 coextensive with the extender portion 26 of the present invention varies in diameter. The countersink portion 50 of hole 25 has its largest diameter closest to the hub 22 and narrows in diameter from its largest diameter to a smaller diameter by the stabilizer portion 32. Hole 25 also has a countersink portion 52 which narrows in diameter from the counterbore portion 48 towards the stabilizer portion 32. Countersink portions 50 and 52 are necessary to give both the crank arm 46B of the one-piece crank 42 and the crank shaft 44 enough clearance to pass through the center of crank sprocket 24, extender portion 26 and stabilizer portion 32 during installation.

In addition to a conventional crank 42, as shown in FIG. 3, a one piece crank with a lengthened crank shaft may be employed allowing the elimination of the counterbore portion 48. Further, the present invention is also intended to work with a multi-piece crank not shown.

The preferred embodiment of the present invention includes a larger chain stay length, the length between the center of the crank sprocket 24 and the center of the free wheel mechanism 40, than the chain stay length of current conventional bicycles. This larger chain stay length is in part accomplished by employing longer length chain stay rails 20A and 20B. The chain stay rails 20A and 20B of the preferred embodiment are about seventeen to seventeen and one-half inches in length measured from the point where the chain stay rail is attached 53 to the hub 22 to the center of the free wheel mechanism 40. Chain stay rails on current conventional bicycles are shorter and are about fifteen and a half inches in length. As seen in FIG. 3, the longer chain stay rails 20A and 20B of the preferred embodiment create angles $\theta$ between the crank hub 22 and the outer sides 23AA and 23AB of chain stay rails 20A and 20B that are less acute than the angles created between the crank hub and the outersides of smaller current conventional chain stay rails. A less acute angle $\theta$ is created because each pair of chain stay rails must angle out to accommodate the same width of the free wheel mechanism 40 and axle of the rear wheel 54. Since the preferred embodiment's angle $\theta$ between the crank hub 22 and the outside 23AA of chain stay rail 20A is less acute, the crank sprocket 24 does not need to be extended as far away from the hub 22 to clear chain stay rail 20A as is necessary for a conventional bicycle with shorter chain stay rails. The extender portion 26 can, therefore, be smaller in thickness.

In a constructed embodiment of the present invention, a separate extender portion 26 and a separate stabilizer portion 32 are riveted to the crank sprocket 24. All three pieces are constructed of T6061 Aluminum Alloy. The crank sprocket 24 has an outside diameter of about 12 inches and has seventy-four teeth. The crank sprocket is mounted on a frame from a ROSS ® bicycle circa 1975. The chain stay rails 20A and 20B are about 17 to 17½ inches long measured from the point of attachment 53 on the hub 22 to the center of the free wheel mechanism 40. The crank sprocket 24 was utilized with both a six gear and a five gear free wheel mechanism 40 having gears containing between 13 and 18 teeth and 17 and 30 teeth respectively. The angle $\theta$ between the outerside 23AA of chain stay rail 20A and the hub 22 is about 85°. The constructed embodiment is able to achieve high rates of speed with both free wheel mechanisms without chain derailment.

While the above described embodiments are in accordance with the present invention, it is understood that the same is not limited thereto, but is susceptible of numerous changes as known to a person skilled in the art, and therefore, this invention is not limited to the details shown and described herein, but intended to cover all such changes and modifications as are obvious to one of ordinary skill in the art.

What is claimed:

1. In a bicycle having a crank hub and a frame including a chain stay rail, a seat tube and a down tube aligned in the same plane as the seat tube, the improvement comprising:
    a free-wheel mechanism comprising a first gear having gear teeth;
    a crank sprocket having sprocket teeth, an outside diameter of at least about 9 inches and rotatable in a first plane substantially parallel to said planarly aligned seat tube and down tube, wherein the number of said sprocket teeth is at least about 4.5 times the number of gear teeth of said first gear of said free wheel mechanism; and
    extender means projecting between said crank sprocket and said hub to spacially extend said crank sprocket away from said hub wherein said crank sprocket does not contact said chain stay rail.

2. The improvement of claim 1, including stabilizing means coupled to said crank sprocket to substantially maintain said crank sprocket rotation in said first plane.

3. The improvement of claim 2 wherein said extender means is coupled to said crank sprocket.

4. The improvement of claim 1 wherein the number of said sprocket teeth is at least about 6.5 times the number of said gear teeth of said first gear of said freewheel mechanism.

5. The improvement of claim 4 wherein said free wheel mechanism further includes a second gear having gear teeth wherein the number of said crank teeth is about 2.3 times the number of said gear teeth of said second gear and about 6.5 times the number of teeth of said first gear.

6. The improvement of claim 1 wherein said crank sprocket has a plane of rotation located at about the center of the axial width of said freewheel mechanism.

7. The improvement of claim 6 wherein the number of said sprocket teeth is at least about 5 times the number of said gear teeth of said first gear.

8. The improvement of claim 6 wherein the number of said sprocket teeth is at least about 6 times the number of said gear teeth of said first gear.

9. The improvement of claim 1 wherein said crank sprocket has an outside diameter of at least about 10 inches.

10. The improvement of claim 1 wherein said crank sprocket has an outside diameter of at least about 12 inches.

11. In a bicycle having a crank hub and a frame including a chain stay rail, a seat tube and a down tube aligned in the same plane as the seat tube, the improvement comprising:
    a free-wheel mechanism comprising a first gear having gear teeth;
    a crank sprocket having sprocket teeth and an outside diameter of at least about 9 inches and rotatable in a first plane substantially parallel to said planarly aligned seat tube and down tube, wherein the number of said sprocket teeth is at least about 4.5 times the number of said gear teeth of said first gear of said free wheel mechanism; and
    stabilizing means coupled to said crank sprocket to substantially maintain said crank sprocket rotation in said first plane.

12. The improvement of claim 11 including extender means projecting between said crank sprocket and said hub to spacially extend said crank sprocket away from said hub wherein said crank sprocket does not contact said chain stay rail.

13. The improvement of claim 12 wherein said extender means is coupled to said crank sprocket.

14. The improvement of claim 11 wherein the number of said sprocket teeth is of at least about 6.5 times the number of said gear teeth of said first gear of said freewheel mechanism.

15. The improvement of claim 14 wherein said free wheel mechanism further includes a second gear having gear teeth wherein the number of said crank teeth is about 2.3 times the number of gear teeth of a said second gear and 6.5 times the number of said gear teeth of said first gear.

16. The improvement of claim 11 wherein said crank sprocket has a plane of rotation located at about the center of the axial width of said freewheel mechanism.

17. The improvement of claim 16 wherein the number of said sprocket teeth is at least about 5 times the number of said gear teeth of said first gear.

18. The improvement of claim 16 wherein the number of said sprocket teeth is at least about 6 times the number of said gear teeth of said first gear.

19. The improvement of claim 11 wherein said crank sprocket has an outside diameter of at least about 10 inches.

20. The improvement of claim 11 wherein said crank sprocket has an outside diameter of at least about 12 inches.

21. In a bicycle having a crank hub and a frame including a chain stay rail, a seat tube and a down tube aligned in the same plane as the seat tube, the improvement comprising:

a free-wheel mechanism comprising a first gear having gear teeth;

a crank sprocket having sprocket teeth and rotatable in a first plane substantially parallel to said planarly aligned seat tube and down tube, wherein the number of said sprocket teeth is at least about 6.5 times the number of gear teeth of said first gear of said free wheel mechanism;

extender means projecting between said crank sprocket and said hub to spacially extend said crank sprocket away from said hub wherein said crank sprocket does not contact said chain stay rail; and wherein said crank sprocket has a plane of rotation located at about the center of the axial width of said freewheel mechanism.

22. In a bicycle having a crank hub and a frame including a chain stay rail, a seat tube and a down tube aligned in the same plane as the seat tube, the improvement comprising:

a free-wheel mechanism comprising a first gear having gear teeth;

a crank sprocket having sprocket teeth and rotatable in a first plane substantially parallel to said planarly aligned seat tube and down tube, wherein the number of said sprocket teeth is at least 6.5 times the number of gear teeth said first gear of said free wheel mechanism;

stabilizing means coupled to said crank sprocket to substantially maintain said crank sprocket rotation in said first plane; and wherein said crank sprocket has a plane of rotation located at about the center of the axial width of said freewheel mechanism.

* * * * *